J. MURDOCK.
Bail for Hollow Ware.

No. 213,524. Patented Mar. 25, 1879.

WITNESSES
Isaac Adam Jr.
George F. Walker

INVENTOR
John Murdock
by his atty
Clarke H. Raymond

UNITED STATES PATENT OFFICE.

JOHN MURDOCK, OF SOUTH CARVER, MASSACHUSETTS.

IMPROVEMENT IN BAILS FOR HOLLOW WARE.

Specification forming part of Letters Patent No. 213,524, dated March 25, 1879; application filed April 16, 1878.

*To all whom it may concern:*

Be it known that I, JOHN MURDOCK, of South Carver, in the county of Plymouth, in the State of Massachusetts, have invented an Improvement in Bails for Hollow Ware, of which the following is a specification:

This invention consists in providing the bail of a kettle or pot with an inward bend and a hollow cast-iron handle, with or without lateral openings, extending across the same, and so secured by the bail to the kettle that it is prevented from coming in contact with the side thereof when at rest.

Figure 1:
Figure 2:
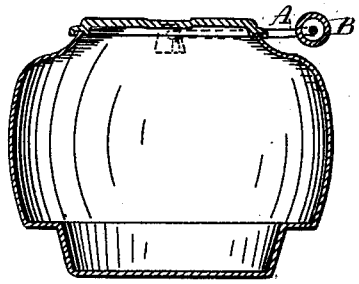
Figure 3:
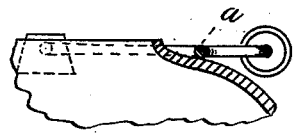
Figure 4:
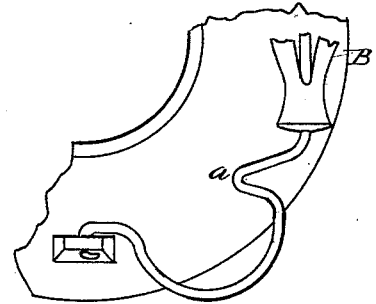

In the drawings, Figure 1 is an elevation of a tea-kettle, showing the bail with its handle erect. Fig. 2 shows a cross-section thereof with the handle and bail at rest or down. Figs. 3 and 4 are detail views of the construction, whereby the handle is prevented from contacting with the sides of the kettle.

The bail A is formed from a metal rod, in much the same way that the ordinary bails are made, excepting at the place where the hollow handle B is secured, where it is bent outward on each side of the handle to hold the same in position thereon. This handle B is preferably cast from iron; but it also may be made of any other suitable metal. It is also preferably supplied with the transverse openings, for the purpose of keeping the same cool by the circulation of air inside the handle and around the bail.

By making the cast-metal handle hollow and supplying it with transverse openings or not, as desired, the radiating-surface of the metal handle is so increased that the heat is rapidly disseminated into the air and the handle kept cool. If the handle were of solid metal, with no space in its interior, the same would retain heat for a long time; but by making the same as a shell, with or without the side openings, a rapid cooling of the same is effected. The longitudinal hole in the center of the handle receives a metal bail, which is passed through it.

The bail is so bent at the points *a* as to contact with the side of the kettle when the bail is dropped, and thus hold the handle away from the side of the kettle.

Heretofore it has not been customary to provide the bails of hollow ware with any handle whatever, and it is very desirable to supply a handle for said ware, and one that shall not heat rapidly and shall be cheaply made, because said bails are so small in diameter generally that they cannot be grasped readily in the hand, and because they are apt to become heated by contact with the side of the kettle. The advantages of my invention, therefore, consist in giving the bails a handle sufficiently large to be readily taken in the hand, so constructed that it is prevented from heating, and so secured to the bail or to the pot that it cannot contact therewith.

I am aware that the patent granted White and Lewin, No. 187,690, shows by the drawing, but does not describe or claim, a wooden handle secured upon a bail, but not prevented from coming in contact with the heated sides of a kettle. This is not the spirit of my invention, for it was to obviate the defects existing by use of a wooden handle that my invention was made, as a wooden handle chars and splits under the action of heat, soon becoming valueless, and, of course, this action of heat upon the wood is increased when the handle can come in direct contact with the heated side of the kettle, as it is plainly apparent from the drawings it can.

Stuart's Reissue No. 4,865, of April 7, 1872, shows a projection on the body of the kettle near the pivoting-place of the bail, which prevents the bail from descending against the side; but the bail in this case has no handle, and is not otherwise similar to what I have described. J. Wiley's Patent No. 172,538, of January 18, 1876, shows a bail with a bend in it; but this bail is not capable of falling on either side of the vessel, nor if it were would the bend which touches the vessel on one side touch it on the other. These two devices do not involve my invention.

Having thus fully described my invention, I claim and desire to secure by Letters Patent of the United States—

The combination of the hollow metallic handle B with the continuous metal bail A, having the internal curve *a*, substantially as described.

JOHN MURDOCK.

Witnesses:
THOMAS SOUTHWORTH,
T. M. SOUTHWORTH.